(12) United States Patent
Keller

(10) Patent No.: US 6,192,196 B1
(45) Date of Patent: Feb. 20, 2001

(54) PANORAMIC CAMERA

(76) Inventor: James McNeel Keller, 121 Cedar St., San Antonio, TX (US) 78210

(*) Notice: Under 35 U.S.C. 154(b), the term of this patent shall be extended for 0 days.

(21) Appl. No.: 09/277,869

(22) Filed: Mar. 29, 1999

Related U.S. Application Data

(62) Division of application No. 08/826,992, filed on Apr. 12, 1997, now Pat. No. 5,950,018, which is a continuation of application No. 08/320,455, filed on Oct. 11, 1994, now Pat. No. 5,659,804.

(51) Int. Cl.[7] ............................. G03B 37/02; G03B 17/00; G03B 29/00
(52) U.S. Cl. .............................. 396/20; 396/300; 396/434
(58) Field of Search ......................... 396/20, 24, 50, 396/300, 242, 21, 22, 23, 244, 256, 260, 270, 434, 429; 348/36, 37

(56) References Cited

U.S. PATENT DOCUMENTS

| | | | | |
|---|---|---|---|---|
| 2,794,379 | * | 6/1957 | McNeil | 95/16 |
| 3,479,939 | * | 11/1969 | Jones | 95/15 |
| 4,943,821 | * | 7/1990 | Gelphman et al. | 354/99 |
| 5,045,872 | * | 9/1991 | Yoshimura et al. | 354/94 |
| 5,262,867 | * | 11/1993 | Kojima | 358/209 |
| 5,606,393 | * | 2/1997 | Schoenherr et al. | 396/20 |
| 5,758,199 | * | 5/1998 | Keller | 396/21 |
| 5,913,078 | * | 6/1999 | Kimura et al. | 396/50 |
| 6,046,766 | * | 4/2000 | Sakata | 348/148 |

* cited by examiner

Primary Examiner—Russell Adams
Assistant Examiner—Chris E Mahoney
(74) Attorney, Agent, or Firm—Albert Peter Durigon

(57) ABSTRACT

A panoramic camera has a camera housing rotatable about an axis of rotation that defines a viewpoint which points along a radial optical path that object rays traverse as the camera is rotated about its axis; a lens assembly having an optical path and a front nodal point mounted for rotation with the camera housing with the optical path of the lens offset from the radial optical path; a specular assembly including an object specular member along the radial optical path mounted for rotation with the housing that cooperates with the lens assembly for gathering object rays that traverse the radial optical path and for deviating them along the optical path of the lens assembly in such a way that the front nodal point of the lens subassembly virtually appears to lie on the axis of rotation thereby eliminating image smearing; and has different ambient light responsive controller embodiments operative either to continuously vary or to preset exposure, or to base exposure on a control sinewave whose phase is obtained either automatically via table look up of latitude or longitude coordinates or via GPS input or manually from a sun protractor and whose amplitude is obtained either automatically from the same information and/or manually by operator keypad input. Means are disclosed for allowing the selection of different near- and far-field object distances and for allowing framing (both vertical and angular) of the panoramic subject. In one embodiment, the specular assembly has object and lens mirrors that pivot between open and closed positions. Different embodiments have film or digital image recording devices.

7 Claims, 10 Drawing Sheets

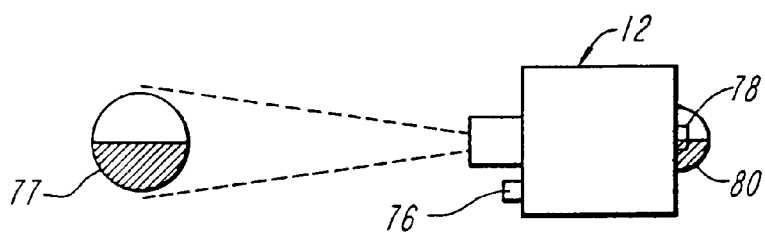
FIG. 6A
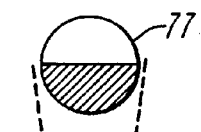
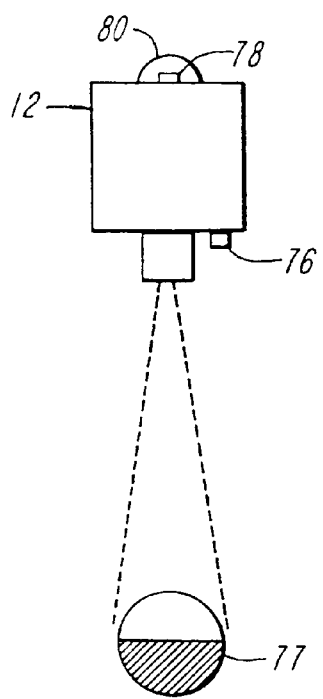
FIG. 6C
FIG. 6B

PANORAMIC CAMERA

CROSS REFERENCE TO RELATED APPLICATIONS

This application is a division of U.S. utility application Ser. No. 08/826,992 entitled Panoramic Camera, filed Apr. 12, 1997 now U.S. Pat. No. 5,950,018, which is a continuation in part of U.S. utility patent application Ser. No. 08/320,455 entitled Panoramic Camera, filed Oct. 11, 1994, now U.S. Pat. No. 5,659,804; and is related to divisional application entitled Panoramic Camera, Ser. No. 08/827,880 filed on Apr. 12, 1997, now U.S. Pat. No. 5,758,199, of U.S. utility application Ser. No. 08/320,455, now U.S. Pat. No. 5,758,199, all of which are of the same inventive entity as herein.

FIELD OF THE INVENTION

This invention is drawn to the field of photography, and more particularly, to a novel panoramic camera.

BACKGROUND OF THE INVENTION

Panoramic cameras are called upon to provide images over three hundred and sixty (360) degrees of selected near and far-field subjects in such a manner that the images recorded thereby are substantially free from smearing as the camera pans the subject and are neither underexposed nor overexposed given the way the ambient light illuminating the subject may vary at different angular positions about the three hundred and sixty degree pan. To provide the ability to select which vertical portion of the subject is to be recorded, provision should be made to allow for framing of the subject. To provide the ability to select the extent of the subject that is to be recorded, provision should be made to allow for the use of different field (or angle) of view lenses, such as fisheye, wide angle, normal and telephoto lenses. If, in addition, such a camera were portable, rugged, reliable, easy to use, inexpensive, compact, and lightweight, it would appeal both to amateur and professional photographers alike.

A periscope-type panorama camera that addresses the problem of image smearing is disclosed by McNeil in U.S. Pat. No. 2,794,379. It includes a cylindrical camera body having spaced apart top and bottom circularly shaped walls that are joined by a cylindrical side wall to provide a light tight enclosure. Film is wrapped along the inside of the cylindrical focal plane of the side wall and a film guide and an advance mechanism are provided to guide and advance the film about the cylindrical focal plane after each exposure.

The top wall is journaled for rotation within the cylindrical side wall and has a central post that is keyed to a motor driven axle located at the center of the cylindrical camera body. As the axle is turned by a motor or other mechanism, the top plate rotates about the axis of rotation of the axle relative to the cylindrical side wall.

A periscope assembly defining an optical axis is mounted for rotation with the rotatable top plate of the cylindrical camera body such that its optical axis is parallel to, radially displaced from and contained in a plane common to it and the central axis of rotation. The periscope includes a lens. First and second mirrors each to either side of the lens are adjustably aligned along the optical axis to place its nodal points on the axis of rotation for a given focal length and object distance.

The lens is mounted in an aperture provided in the top wall of the cylindrical camera body. The focal length of the lens is made equal to the radius of the cylindrical side wall of the camera body. The radius of the cylindrical side wall defines the focal length of the lens. For different focal lengths differently sized housings are required.

The first mirror of the periscope assembly (below the lens) is mounted at forty five degrees to the optical axis in the camera body so as to confront the rear nodal point of the lens and the cylindrical focal plane. Both the lens and the first mirror must be separately adjusted to align the virtual image of the rear nodal point on the axis of rotation. To do so, the first mirror is axially adjusted along the optical axis until it squarely confronts the cylindrical focal plane and is permanently keyed into position. The lens is then axially adjusted in its mounting aperture until the distance between its rear nodal point and the first mirror equals the distance by which the optical and rotational axes are displaced. These adjustments are laborious and time consuming and require that the cylindrical body be disassembled.

The second mirror of the periscope assembly (above the lens) in one embodiment is a roof prism that is mounted outside the camera body confronting both the front nodal point of the lens and the subject. The roof prism is required to reverse the image. In an alternative embodiment, a mirror is substituted for the roof prism and a relay lens is required to reverse the image. In either embodiment, the element is axially adjusted until the distance between it and the front nodal point of the lens is such that the virtual image of the front nodal point of the lens appears to lie on the axis of rotation.

To provide for different fields of view, differently sized mirrors and/or lenses would need to be implemented. The change in the size of the first mirror might require a different radial offset between the optical and rotational axes. Thus a different, specially constructed camera body would be required. The change in the focal length of the lens could also require a differently sized cylindrical side wall. Again, a specially constructed camera body would be required. The roof prism, or second mirror in the alternate embodiment, excludes a wide angle of view because the optical path is folded across the orientation of the exposure slit. For the mirror embodiment, where the relay lens is required to reverse the image, the angle of view is further limited because the combination of lenses excludes far off-axis rays.

No provision is made, or able to be made, for framing the subject. To provide for different object distances for a given focal length, the housing as well as the periscope assembly would need to be disassembled, and two adjustments made for the first mirror and a third adjustment made for the second mirror to re-effect the alignments of the virtual positions of the front and rear nodal points of the lens onto the actual axis of rotation. No provision is made for the effects of varying ambient lighting conditions as the camera pans the subject.

An underwater panoramic camera that addresses the problem of image smearing given an object distance and fixed focal length is disclosed by McNeil in U.S. Pat. No. 3,141, 397. The camera includes a cylindrical camera body having circular top and bottom plates that are joined by an annular lens that constitutes the side wall of the cylindrical camera body. An arm having a radially extending lens barrel defining an optical axis on one side and a film guide and feed assembly on its other side is rotatably mounted in the cylindrical camera body such that as the lens barrel end of the arm is turned about the axis of rotation in one angular direction the film guide and feed assembly on the other side of the arm advances film in the opposite angular direction.

The in-line lens system, which includes the expensive and fragile annular lens of the cylindrical side wall of the camera body and the optical elements of the in-line lens barrel itself, provides a fixed focal length and a given object distance. To prevent smearing as the in-line barrel pans for a fixed focus and given object distance, the center of rotation of the arm is positioned so that the ratio of the eccentricities of the front and rear nodal points of the lens is made equal to the ratio of the object distance to the image distance.

There is, however, appreciable smearing for subjects at other object distances. To prevent smearing for subjects at other object distances, the housing needs to be disassembled and another in-line lens assembly with the proscribed center of rotation for each different given object distance installed. In addition, no provision is made, or able to be made, for changing the framing of the subject, and no provision is made, or able to be made, for changing the field of view.

The radial dimension of the cylindrical housing body depends on the fixed focal length of the lens. Different focal lengths would thus require different, specially manufactured housing bodies. No provision is made for the effects of varying ambient light as the camera pans.

An in-line panoramic camera with an off-axis lens that addresses the problem of image smearing is disclosed by Cummins in U.S. Pat. No. 3,311,038. The camera is like that of the '397 patent except that it has a stationary film guide and advance assembly defining an image surface and has an arcuate, cylindrical-segment lens that constitutes but a part of the side wall of the camera. As in the '397 patent, the in-line barrel lens is rotated about a preselected point (center of rotation) that is between the front and rear nodal points of the lens selected such that the ratio of the eccentricities of the front and rear nodal points is made equal to the ratio of the object distance to the image distance for a given object distance and focal length.

In one embodiment where the rear nodal point of the lens confronts the image surface, a pair of mirrors is provided therebetween that decreases the distance from the center of rotation of the arm of the in-line lens to the image surface by an amount that equals the eccentricity of the rear nodal point from the point of rotation of the lens, and in another embodiment where the front nodal point confronts the image surface, a prism is provided therebetween that increases the distance from the center of rotation of the arm to the focal surface by an amount that equals the eccentricity of the rear nodal point. In either embodiment, however, different, specially designed and manufactured lens assemblies need to be provided for different given object distances. The focal length of the lens is made equal to the radius of the stationary film guide and feed assembly. Different, specially constructed housing bodies are required for different focal lengths. No provision is made, nor is able to be made, for changing the field of view and/or the framing of the subject. No provision is made that accounts for the effects of varying ambient light conditions.

An in-line and fixed focus panoramic camera that addresses the problem of controlling exposure for the way the light varies about a panoramic subject is disclosed by Waroux in U.S. Pat. No. 3,246,588. In one embodiment, single panoramic images are provided and in another stereo panoramic images. In either embodiment, an in-line lens subassembly having a fixed focus and an optical axis is mounted for rotation with a camera housing with its optical axis offset from a stationary drum of a film guide and feed subassembly that is journaled for rotation about the axis of the camera housing. In either embodiment, no provision is made to take account of the blurring that results from the offset of the optical axis of the lens subassembly from the axis of rotation and no provision is made for framing, for different focal lengths and their correspondingly different fields (angle) of view, or for selectable near- and far-field object distances.

To control exposure, in one embodiment one of one or more cams having differently shaped profiles and/or a cam of variable profile is pre-selected to drive the camera housing about its axis of rotation with a speed that corresponds to the profile of the cam selected. In this embodiment, the cam that is pre-selected is the one that is judged best in the field to match the prevailing lighting conditions. In another embodiment, the cam that is selected is set to control the size of the diaphragm of the lens subassembly rather than the speed of rotation. Again, once selected, the way the diaphragm is varied with angle is pre-set. In a further embodiment, a light meter is used to change either the speed or the size of the diaphragm point-to-point.

SUMMARY OF THE INVENTION

It is accordingly the principal object of the present invention to provide a panoramic camera that is portable, rugged, reliable, easy to use, inexpensive and compact, lightweight and suitable for use for both amateur and professional photographers alike; that provides smear-free images as it pans about a three hundred and sixty (360) degree arc; that may be readily adjusted to accommodate both near- and far-field subjects; that may be readily adjusted to provide selected framing and to accommodate different selectable fields (angle) of view including very wide vertical angle lenses; and that automatically and continually adjusts for varying ambient light conditions as the camera pans different angular portions of the three hundred and sixty degree subject.

The panoramic camera of the present invention includes a camera housing having a front wall and a rear wall. An axle defining an axis of rotation is mounted in said camera housing. Means are coupled to said axle and said housing for rotating the housing about said axis of rotation of said axle such that object rays from the panoramic subject traverse a radial optical path that extends generally perpendicularly between said axis of rotation and that portion of the panoramic subject confronting said front wall of the camera housing as the camera housing is rotated about said axis of rotation.

A lens subassembly defining an optical axis and having front and rear nodal points and a focal length is mounted at a predetermined position for rotation with said camera housing determined such that the lens subassembly is remote from said axle with its optical axis in a plane different from any plane that contains said axis of rotation and with its optical axis offset from said radial optical path that said object rays traverse and at a predetermined orientation thereto. In one embodiment, the orientation is a parallel orientation and in another it is a perpendicular one.

A specular subassembly means having an optical train including an object specular member is mounted for rotation with said housing body for gathering said object rays that traverse said radial optical path and for deviating the same along said optical path of said lens assembly that is offset from said radial optical path in such a way that said front nodal point of said lens subassembly appears to virtually lie on said axis of rotation. In one embodiment, the specular subassembly includes a lens specular member as well as the object specular member, where the object and lens specular members are mounted for rotation with the front wall of the camera housing with the object specular member lying on said radial optical path and confronting the lens specular member and with the lens specular member lying on the optical axis of the lens subassembly and confronting both the object specular member and the lens subassembly. Means coupled between the members and the housing move the mirrors between closed and open positions. In another embodiment, the object specular member is mounted inside the camera housing along both said radial optical path and said optical path of said lens subassembly and confronting both the subject and the lens subassembly. In either embodiment, there is no smearing of the image as the camera pans the subject because, from the subjects point of view, the lens subassembly appears to rotate about its front nodal point.

Means having an imaging surface are mounted for rotation with said camera housing in such position that said imaging surface is remote from said axle and confronts the rear nodal point of said lens subassembly for recording images of said panoramic subject imaged thereto by said lens subassembly. In one embodiment, the recording means includes film and a cooperative film guide and advance mechanism and in another embodiment it includes a digital recording device.

A light sensor means is mounted to said camera housing for providing at least one signal representative of ambient light intensity. In alternate embodiments, the light sensor means includes a reflected light sensor mounted to the front wall of the camera housing, an incident light sensor mounted to the rear wall of the camera housing, a reflected light sensor and an incident light sensor mounted respectively to the front and rear walls of the camera housing and a light sensor mounted on a two degree of freedom swivel mount operative with a removable diffuser dome to sample light from a generally upward orientation so as to provide a general incident light reading, horizontally and away from lens direction to provide angular phase related incident light reading, and operative without the removable diffuser dome to sample light from any area of the panoramic scene so as to provide a reflected light reading therefrom. In one embodiment, means are mounted to said camera housing responsive to said at least one signal and coupled to said rotation means for continually varying automatically the speed of rotation of said housing about said axis of rotation in direct relation to the magnitude of said at least one signal. Because the resulting exposure duration is continually varied inversely to the intensity of the ambient light, both under- and over-exposures are thereby automatically eliminated. By regulating the speed by the incident light generated signal, rather than by the reflected light generated signal, abrupt variations in scene luminance cause neither abrupt shifts in speed nor the consequent exposure banding at the transition points. In another embodiment, means are mounted to said camera housing responsive to said at least one signal and coupled to said rotation means for preselecting the speed of rotation of said housing about said axis of rotation based on the magnitude of a single reading of said at least one signal thereby yielding a constant exposure for the entire rotation of the camera. In yet another embodiment, processor-implemented means are disclosed for providing a sinewave of one cycle per revolution having an amplitude and a phase, whose amplitude is matched both to ambient lighting conditions and to the declination of the sun and whose phase is matched to the position of the sun in the plane of camera rotation relative to the starting position of the lens, and an exposure controller means, responsive to said sinewave, are disclosed for controllably compensating exposure for the variations found in lighting about a typical outdoor panoramic scene. In one embodiment, a sun protractor having plural concentric sun declination rings indexed to a plurality of stops is mounted for rotation with the camera housing. The position of the sun in the plane of camera rotation is read off the protractor and manually entered on a keypad. The declination of the sun, and therewith the corresponding brightness thereof, is read off the appropriate one of the concentric sun declination rings, and it is entered on the keypad. In another embodiment, the position of the sun in the plane of camera rotation is automatically determined from the readings provided by a time and date clock, by an electronic compass indexed to the starting position of the lens, and from latitude and longitude readings provided either by a GPS (global positioning satellite system) or by table look-up. In this embodiment, the amplitude of the sinewave is determined by the declination of the sun and may also be manually set by keypad entry for clear, partly cloudy, overcast, deep shade or other such conditions.

First means are mounted for rotation with the camera housing for adjusting the lateral spacing between said imaging surface of said image recording means and said rear nodal point of said lens subassembly and second means are mounted for rotation with said camera housing for adjusting the vertical spacing between said imaging surface of said image recording means and said rear nodal point of said lens subassembly. The first adjustment means enables to select any focal length lens and corresponding field of view and to select that image distance that corresponds to any selected near- and far-field object distance for a given focal length without re-configuring the camera housing. The second adjustment means enables to provide framing, i.e., a selected vertical shift of the image relative to its horizon.

BRIEF DESCRIPTION OF THE DRAWINGS

Other objects, aspects and advantageous features of the present invention will become apparent as the invention becomes better understood by referring to the following detailed description of the preferred embodiments thereof and to the drawings, wherein:

FIG. 6 illustrates plan pictorial diagrams in the FIGS. 6A, 6B, 6C thereof that are useful in explaining the operation of the ambient light responsive controller of a panoramic camera in accord with the present invention;

DETAILED DESCRIPTION OF THE PREFERRED EMBODIMENTS

Figure 1A:
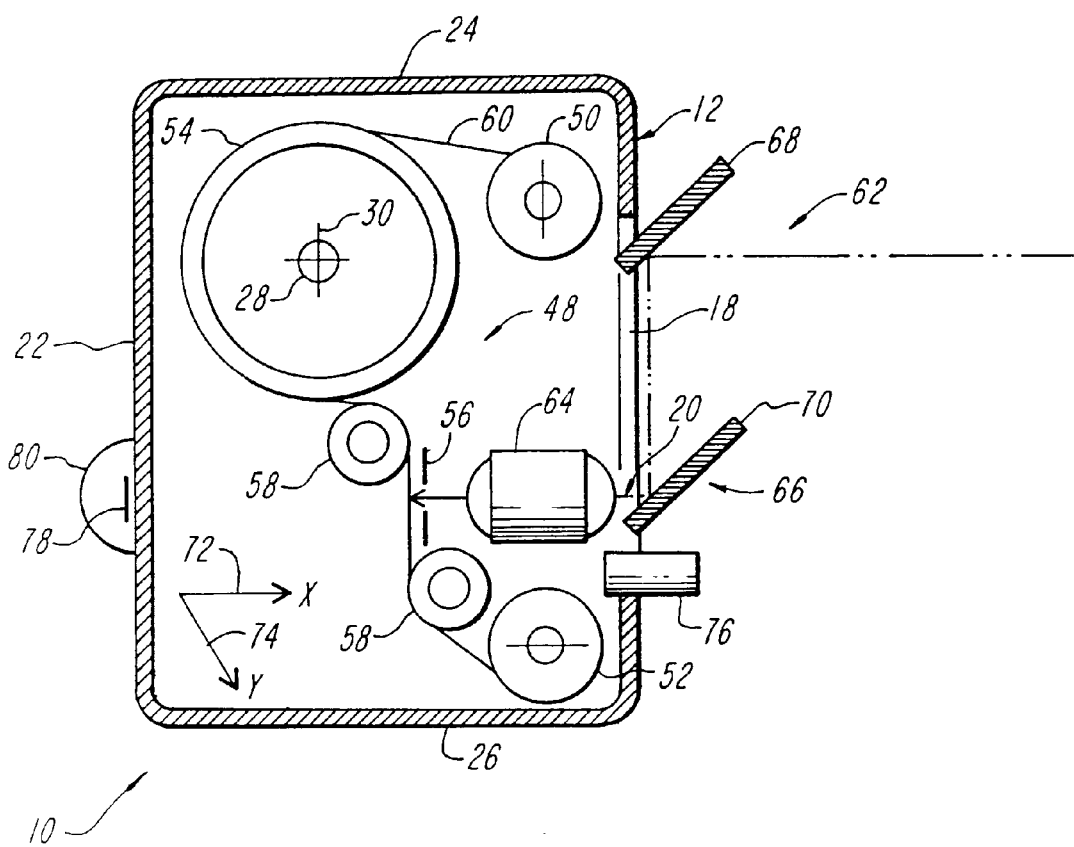
FIG. 1 is a schematic cross-sectional view in the FIG. 1A thereof and is a schematic perspective view in the FIG. 1B thereof of a panoramic camera in accord with the present invention illustrating it in one of its presently preferred embodiments.
Figure 1B:
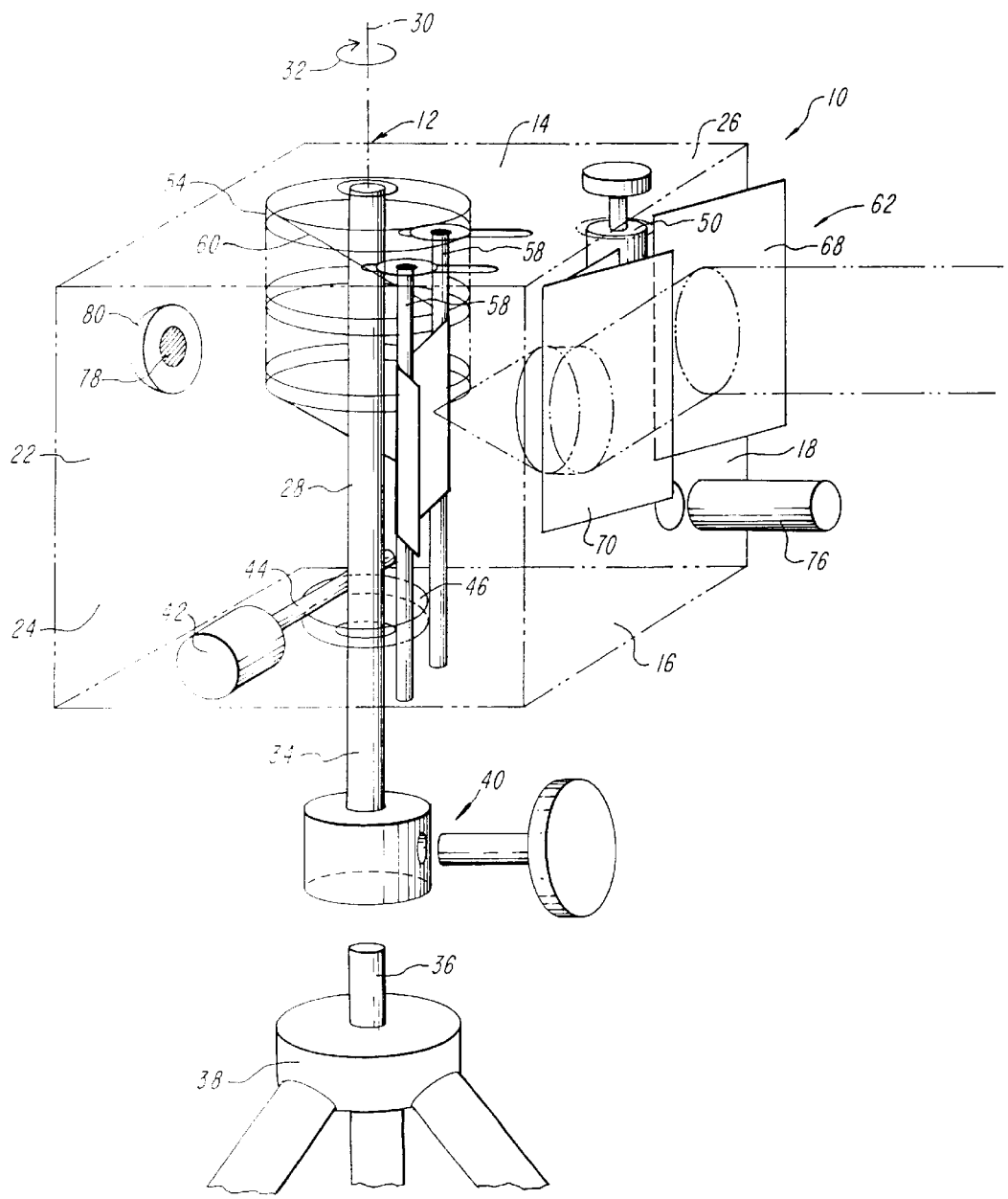

Referring now to FIG. 1, generally designated at 10 is one presently preferred embodiment of a panoramic camera in accord with the present invention. The camera 10 includes a housing generally designated 12 having a top wall 14 (FIG. 1B), a bottom wall 16 (FIG. 1B), a front wall 18 having an aperture therethrough generally designated 20, a back wall 22, and opposing side walls 24,26. Any other suitable housing body having a front and providing a light-tight enclosure may be employed without departing from the inventive concepts.

The housing 12 is journaled for rotation about a vertical axle 28 preferably by bearings provided therefor in the top and bottom walls 14,16 thereof. The axle 28, which extends between the top and bottom wall 14,16, provides a rigid support about which the camera rotates about an axis of rotation 30 as illustrated by an arrow 32 (FIG. 1B). The axle 28 has an end 34 (FIG. 1B) that extends beyond the bottom wall 16 of the camera housing 12. The end 34 is mounted to a telescoping shaft 36 of a tripod or other camera support 38 by a releasable lock assembly generally designated 40 (FIG. 1B) or other suitable means.

A motor 42 having a worm gear 44 mounted to its shaft is mounted for rotation with the bottom wall 16 of the housing. A worm wheel gear 46 is concentrically mounted to the axle 28. As the shaft of the motor 42 turns, the drive spindle of the worm gear 44 turns the teeth of the gear 46, which rotates the bottom wall 16 about the axle 28 and, with it, the camera housing 12 about the axis of rotation 30. Any suitable means other than rotating the camera housing for panning the subject may be employed, such as rotating a lens and therewith its viewpoint and/or rotating a mirror or other specular assembly, although the presently preferred embodiment enjoys the advantage, among others, that the axle and the drive drum to be described mounted for rotation therewith may be readily replaced with an axle having a drive drum of another radius to accommodate lenses of various focal lengths and thereby provide any selected vertical field of view. In addition, by having the drive drum rigidly and directly linked to the worm wheel via the axle, only one gear interface is needed to rotate the housing, which enjoys not only the advantages of being light in weight, reliable and inexpensive but also minimizes gear backlash and therewith exposure irregularities in the form of banding. A film guide and feed assembly generally designated 48 is mounted inside the camera housing 12. The assembly 48 includes film supply spool 50 and take-up mechanism 52, a film drive drum 54, an exposure slit 56 and a pair of film guide rollers 58. Film 60 released by the film supply mechanism 50 is threaded over the drum 54 through the guide rollers 58 past the exposure slit 56 and into the film take-up mechanism 52. The drive drum is mounted concentric with and fixed to the axle 28 so that it remains stationary as the housing 12 is turned about the axis of rotation 30 by the motor 42. As the housing 12 rotates about the drum 54, the film 60 is moved past the exposure slit 56 with a linear velocity that depends on the radius of the drive drum 54 and the angular velocity of the panoramic swing of the camera housing 12 about the axis of rotation 30.

An optical assembly generally designated 62 is mounted for rotation with the camera housing 12. The assembly 62 includes a lens subassembly 64 and a specular subassembly generally designated 66, both mounted for rotation with the camera housing 12. The lens subassembly defines an optical axis, has front and rear nodal points and a focal length and it is mounted inside the housing 12 with its front nodal point confronting the aperture 20 and with its rear nodal point confronting the exposure slit 56 of the film feed and guide assembly 48. The specular subassembly 66 includes an object mirror 68 and a lens mirror 70 spaced from the object mirror 68, which are mounted for pivotal movement to the outside of the front wall 18 of the housing 12 in a manner to be described. An optical path from the object mirror 68 to the lens subassembly 64 is provided by the mirror 68, which confronts the mirror 70 and the object, and by the mirror 70, which confronts both the front nodal point of the lens subassembly 64 and the object mirror 68. Although discrete mirrors 68,70 are illustrated, any specular subassembly that provides the same optical path, such as a monolithic optical element, may be employed. The specular subassembly and/or lens subassembly may be positioned outside or inside the camera housing alternately without departing from the inventive concepts.

A slide mechanism illustrated schematically by arrow 72 marked "X" is coupled between each of the rollers of the pair of rollers 58 and the housing 12 to slidably adjust their position towards and away from the rear nodal point of the lens subassembly 64 in the "X" direction and to secure them in any position selected. A slide mechanism schematically illustrated by arrow 74 and marked "Y" is coupled between the lens subassembly 64 and the housing 12 for adjusting the position of the lens subassembly 64 vertically in the "Y" direction (in/out of the page).

In the illustrated embodiment, the drive drum 54 on the one hand and the guide rollers 58 and lens subassembly 64 on the other are mounted in the housing body towards opposing sides thereof, which provides the clearance that allows interference-free adjustment of the slide mechanisms 72,74, although it will be appreciated that other off-set spacing may be employed without departing from the inventive concepts so long as there is sufficient clearance between the guide rollers, the drive drum and axle, and between the lens subassembly and the drive drum and axle, so as to allow interference-free adjustment of the X,Y slide mechanisms 72,74. It will be appreciated that any suitable mechanisms may be employed to adjust the relative spacing between the guide rollers and the lens subassembly in the "X" and "Y" directions without departing from the inventive concepts.

To ensure perfect synchronization of image speed and film advance, the radius of the drive drum 54 of the film guide and feed assembly 48 is selected to be equal in magnitude to the focal length of the lens subassembly 64. The offset placement of the drive drum position and of the lens subassembly position enables to accept different focal length lenses and drive drums with commensurate radii without re-configuring the camera housing for each different focal length selected. Wide angle, normal and other focal length lens subassemblies may thereby be readily accommodated without re-designing the camera housing 12. It should be noted that a pair of symmetrically stepped drums, not shown, may be employed, where each different step corresponds to another focal length lens or object distance that may be selected. The offset placement provides the clearance that enables the use of the symmetrically stepped drive drums.

To provide smearing-free exposure of the film 60 as the camera housing 12 rotates about the axis of rotation 30, the lens subassembly 64 is positioned with its rear nodal point spaced from the film a distance that corresponds to the focal length of the lens subassembly and with its front nodal point spaced from the object mirror 68 along the optical path of the specular subassembly 66 a distance that corresponds to the distance from the object mirror 68 to the axis of rotation 30 of the camera housing 12. With this arrangement, the front nodal point of the lens subassembly 64 virtually appears, from the point of view of the subject, to lie on the axis of rotation 30. The image of the subject on the film 60 thereby appears to be stationary during the time it takes a given point on the film 60 to traverse the exposure slit 56, thereby providing smearing-free exposure of the film 60 as the camera housing 12 is rotated irregardless of object distance.

To accommodate different near- and far-field subjects at any selected object distance, the film guide roller slide mechanisms 72 are laterally spaced from the lens subassembly 64 at that image distance that corresponds to the object distance selected. For any near-and far-field object distance selected, smearing-free exposure of the film 60 is thereby provided at the corresponding image distance without re-designing the camera housing 12. For large changes of focus, a drive drum of the appropriate radius, or a different step on the symmetrically stepped drive drums, may be readily used without re-configuring the camera housing.

A reflected light sensor 76, such as a narrow angle of acceptance photocell, is mounted to the front wall 18 of the camera housing 12 and an incident light sensor 78, such as a photocell, is mounted to the back wall 18 of the camera housing 12 under a diffusion dome 80. The sensors 76,78 alone and in combination cooperate with one embodiment of an ambient light responsive controller to be described to vary the exposure time of the film 60 in dependence on the variation in ambient lighting conditions encountered across a typical panoramic scene thereby preventing both under- and over-exposure of the film.

Referring now to FIG. 2, the specular subassembly 66 of the optical assembly 62 in the presently preferred embodiment is mounted to the outside of the front wall 18 of the camera housing 12 such that the object and lens specular members 68,70 thereof are movable between closed and open positions. The lateral edge of the member 68 remote from the aperture 20 is rotatably mounted on an axle 82 for pivoting motion about the front wall 18, and the lateral edge of the member 70 proximate the aperture 20 is rotatably mounted on an axle 84 for pivoting motion about the front wall 18. The opposing lateral edges of a cover/baffle plate 86 are pivotally mounted to respective ones of the pivotally swinging edges of the members 68,70 via axles 88,90. An indexing plate 92 is rotatably mounted on an axle 94 for pivoting motion about the top wall 14 of the housing 12. Torsion springs, not shown, are mounted about the axles 82,84,94 for biasing the members 68,70 in their normally open conditions where they pivot out from the front wall 18 of the housing 12 and for biasing the indexing plate 92 in its normally closed condition where it lies flat against the top wall 14 of the housing 12 (FIG. 2A). A lens cover plate 96 extends beyond the lateral edge of the object mirror 68 a distance that allows it to cover the confronting face of the lens subassembly 64.

Figure 2A:
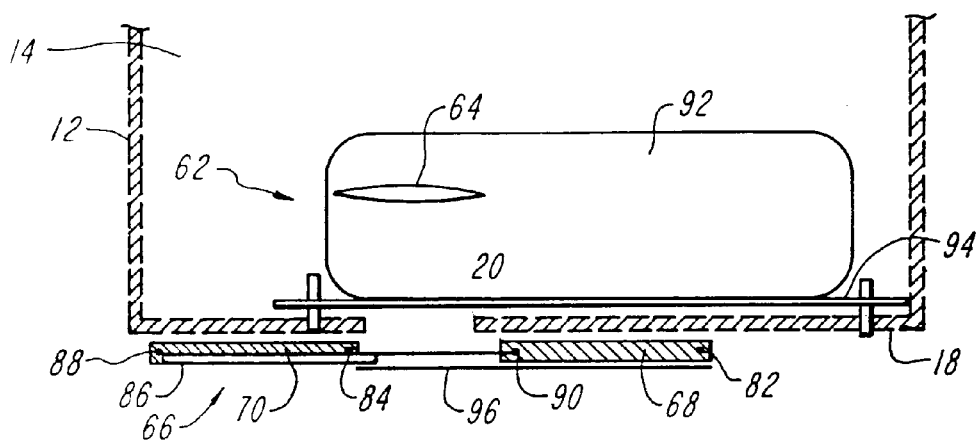
FIG. 2 illustrates schematic plan views in the FIGS. 2A, 2B thereof and illustrates pictorial front views in the FIGS. 2C, 2D thereof that are useful in explaining the operation of the embodiment of the optical assembly of FIG. 1.
Figure 2C:
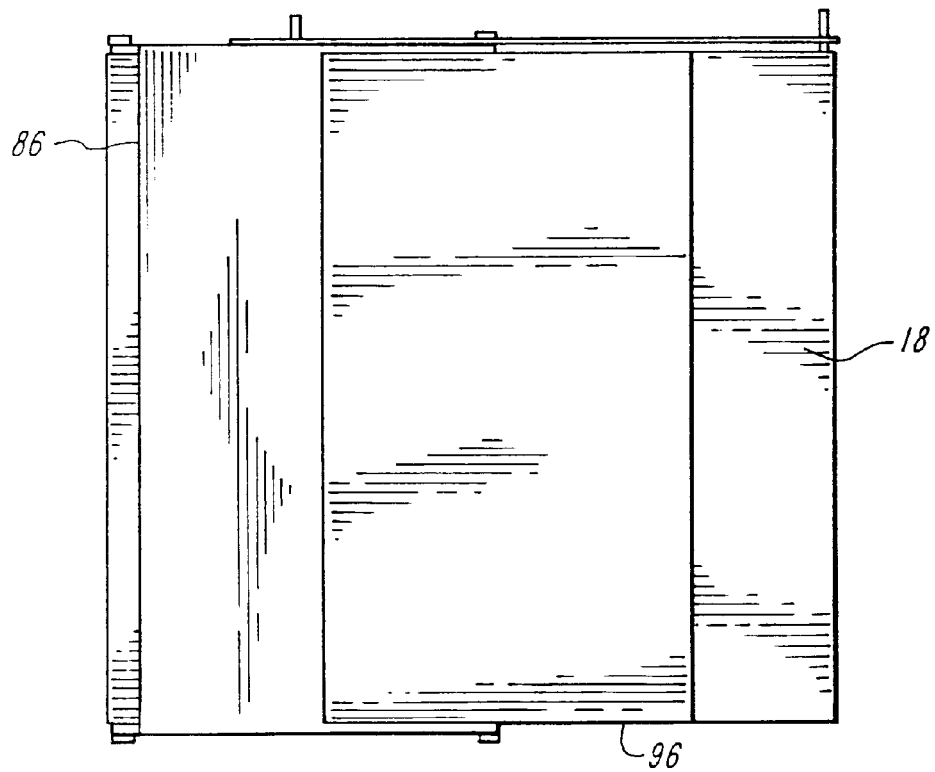

In the normally closed condition of the specular subassembly 66, the cover/baffle plate 86 protects the specular surface of the lens mirror 70, the lens cover 96 covers the aperture 20 and lens subassembly 64, and the mirrors 68,70 lie flat against the front wall 18 of the housing as best seen in FIGS. 2A, 2C. In their closed condition, the mirrors 68,70 are locked against the front wall of the camera housing by a releasable clamp, not shown.

Figure 2B:
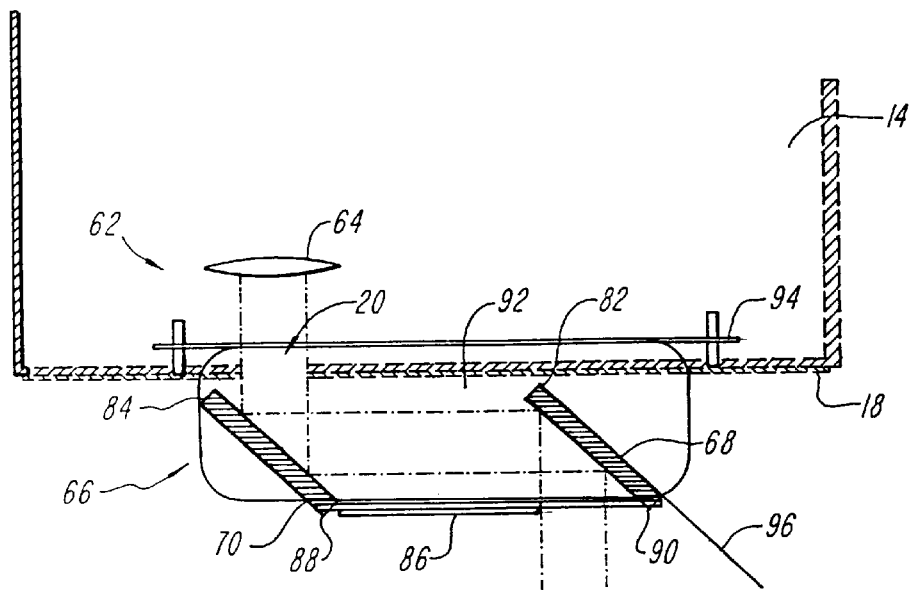
Figure 2D:
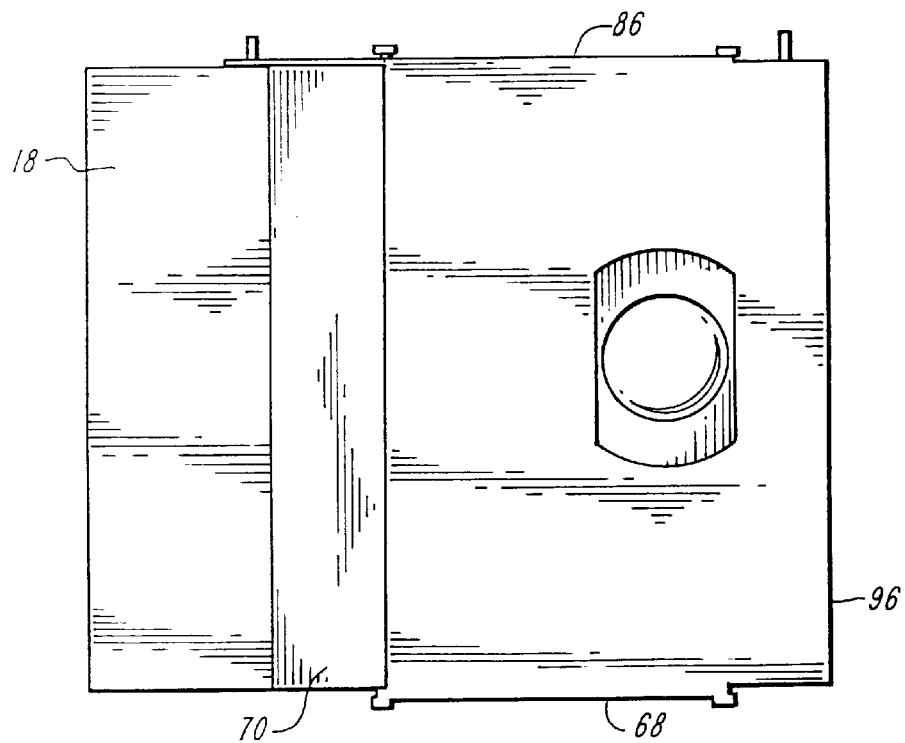

To open the specular subassembly 66, the clamp is released and the resilience of the torsion springs mounted to the axles 82,84 swings the mirrors 68,70 to their open position, while the indexing plate 92 is simultaneously pulled to overcome the resilience of the torsion spring mounted to the axle 94 and to swing it away from its normally closed position. The indexing plate 92 is then positioned over the members 68,70. The mirrors 68,70 have projecting tabs which abut the indexing plate 92, locking them in their use condition as best seen in FIGS. 2B, 2D.

In the open condition of the specular subassembly 66, cover/baffle plate 86 acts as a light baffle, and the indexing plate 92 functions as a shade preventing ghosting and glare.

To return the specular subassembly 66 to its closed condition, the mirrors 68,70 are sprung against their bias to release the indexing plate 92, the plate 92 is lifted out of engagement with the specular subassembly and returned to its normally closed position while the lens cover 96 is pivoted to force the specular members 68,70 to return to their closed position where they are clamped. Any other suitable mechanism may be employed to move the mirrors between their open and closed positions.

Figure 3:
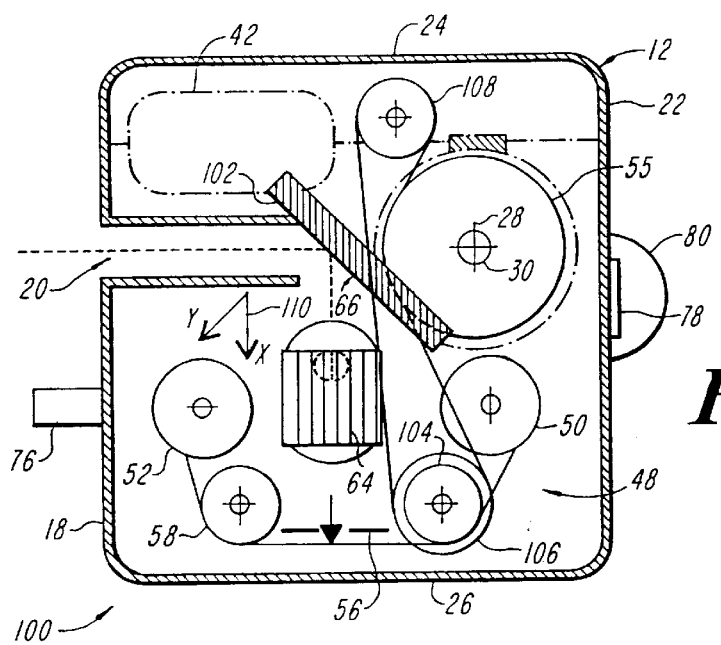
FIG. 3 is a schematic cross-sectional view of a panoramic camera in accord with the present invention illustrating it in another of its presently preferred embodiments.

Referring now to FIG. 3, generally designated at 100 is another presently preferred embodiment of a panoramic camera in accord with the present invention. Identical components bear the same numerals as the embodiment 10 of FIG. 1 and are not described again for the sake of brevity of disclosure. The embodiment 100 differs from the embodiment 10 in three principal respects. The specular subassembly 66 consists of a single object/lens member 102 that is mounted for rotation with the housing 12 inside of the camera 100 with its specular surface confronting both the object through aperture 20 thereof and the lens subassembly 64. As the second respect, one of the guide rollers 58 of the film feed and guide assembly 48 is constituted as a film drive drum 104 of radius "rf" and a film drive pulley 106 of radius "rp". The pulley 106 is turned by a belt that loops around pulley 106 and a pulley 108, which belt is driven by a stationary pulley 55 as the housing 12 is rotated about the axis 30. The pulley 55 is mounted to the axle 28 so that it remains stationary as the housing 12 is turned about the axis 30 by the motor 42. The stationary pulley 55 has a radius "rs". The focal length of the lens subassembly 64 and the radii of the drum 104 and pulleys 55,106 are selected to satisfy the relation "f/rf=rs/rp" in order to synchronize film advance and camera angular velocity and thereby prevent image smearing for any focal length "f" that may be selected. As the third respect, the lens subassembly 64 is mounted for sliding motion towards and away from the exposure slit 56 in an "X" direction to provide that image distance that corresponds to any selected near- and far-field object distance selected and is mounted for sliding motion along a "Y" direction perpendicular to the plane of the page to provide for framing of the object as schematically illustrated by crossed arrows 110 marked "X" and "Y". Any suitable slide mechanism may be employed without departing from the inventive concepts.

As in the embodiment 10 of FIG. 1, the distance along the optical path of the specular subassembly from the object mirror 102 to the front nodal point of the lens subassembly 64 is made equal to the distance from the object/lens mirror 102 to the axis of rotation 30 of the camera 100 to prevent smearing of images as the camera is rotated irregardless of object distance.

The drive pulley 55 and the lens subassembly 64 are mounted towards laterally opposing sides of the camera housing to provide the clearance that enables interference-free adjustment of the X and/or Y slide mechanisms 110 to provide the image distance that corresponds to any selected near- and far-field object distance and that enables to accept any radii for the drum 104 and pulleys 55,106 that correspond to a given focal length of the lens subassembly without re-configuring the camera housing 12. In addition, the clearance enables to accept the pair of symmetrically opposing stepped drive drums.

Figure 4:
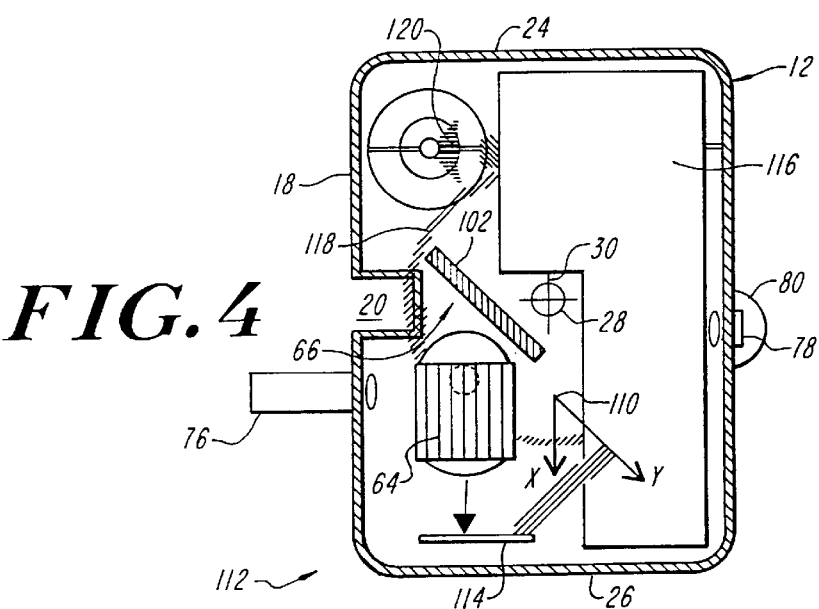
FIG. 4 is a schematic cross-sectional view of a panoramic camera in accord with the present invention illustrating it in yet another of its presently preferred embodiments.

Referring now to FIG. 4, generally designated at 112 is another presently preferred embodiment of a panoramic camera in accord with the present invention. Identical components bear the same numerals as the embodiment 100 of FIG. 3 and are not described again for the sake of brevity of disclosure. The embodiment 110 differs from the embodiment 100 in two principal respects. As the first respect, the film feed and guide assembly 48 (FIG. 3) is replaced by a digital recording device 114, such as a single-row charge coupled device and its associated electronics package 116, mounted for rotation with the housing 12 of the camera 112. The electronics package 116 typically includes an amplifier, for adjusting the gain of the output signal of the CCD array, and a control input for varying the line time (capture rate) of the CCD array. As the second respect, a stationary worm wheel gear 118 is mounted concentric with and fixed to the axle 28 and is driven by a motor having a worm gear 120.

As in the embodiment 100 of FIG. 3, the distance along the optical path of the specular subassembly 66 from the object/lens mirror 102 to the front nodal point of the lens subassembly 64 is made equal to the distance from the object/lens mirror 102 to the axis of rotation 30 of the camera 112 to prevent smearing of images as the camera is rotated irregardless of object distance. The electronics package on the one hand and the lens subassembly 64 on the other are mounted towards laterally opposing sides of the camera housing to provide the clearance that enables interference-free adjustment of the X,Y mechanism(s) 110 to provide the image distance that corresponds to any selected near- and far-field object distance in X, that enables to frame the image in Y and that enables to accept any given focal length of any selected field (angle) of view lens subassembly 64 without re-configuring the camera housing 12.

Figure 5:
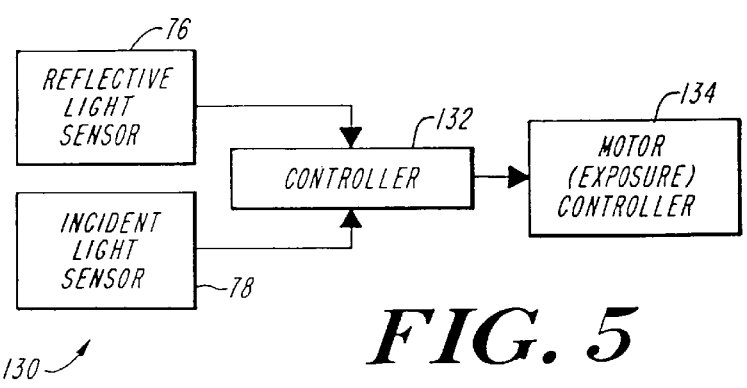
FIG. 5 is a functional block diagram of one embodiment of an ambient light responsive controller useful with any of the presently preferred embodiments of a panoramic camera or other panoramic camera in accord with the present invention.

Referring now to FIG. 5, generally designated at 130 is a functional block diagram of an ambient light responsive controller useful with any of the presently preferred embodiments of a panoramic camera or other panoramic camera in accord with the present invention. The controller 130 includes a reflective light sensor 76 mounted to the front wall of the camera housing and/or an incident light sensor 78 mounted to the rear wall of the camera housing of any embodiment of any panoramic camera in accord with the present invention.

The reflected light sensor 76 mounted to the front wall of the camera housing is oriented to always measure the intensity of the light reflected by the subject 77. As shown in FIGS. 6A, 6B, 6C by the matching shading on the subject 77 and dome 80, the ambient sensor 78 on the back wall of any presently preferred embodiment or other camera in accord with the inventive concepts is always oriented so as to sample ambient light corresponding to that on the side of the subject facing the camera. It will be appreciated that the incident light sensor need not be mounted on the back wall of the camera housing so long as it is oriented to face away from the pointing direction of the camera in the diametrically opposite direction. It will also be appreciated that the reflected light sensor need not be mounted on the front wall of the camera housing so long as it faces in the same direction that the camera points.

In an alternative embodiment where a motor housing is provided separate from the camera chassis, a light sensor may be affixed to the end of a stationary, hollow axle to avoid the use of a signal noise generating commutator. The stationary, hollow axle extends to the top wall of the camera housing and to the bottom wall of the motor housing. A gear mounted to the camera chassis is driven by a motor in the motor housing such that the camera chassis is rotatably driven about the stationary, hollow axle. The light sensor at the top end of the stationary, hollow axle is electrically connected to a motor controller to be described by passing the electrical wires therefrom through the passageway provided by the hollow axle. The light sensor at the top end of the stationary, hollow axle is covered by an interchangeable light modifying member affixed to and rotating with the camera chassis. The aforementioned light modifying member may comprise a diffusion dome with half of its surface opaqued so as to admit ambient light from one side to provide an incident light sensor system, or a specular member mounted so as to direct reflected light from the scene down to the light sensor to provide a reflected light sensor system, or a combination employing a beam splitter to reflect object rays to the light sensor (photocell) from a small opening in the opaque side of the dome while transmitting incident light from the translucent side of the dome to provide an incident and reflected light sensor system.

On a typical cloudless daylight scene, proper exposure may vary by as much as three (3) stops, or a factor of eight (8), across a three hundred and sixty degree (360) pan, which variation is beyond the exposure latitude of the film. Furthermore, this variation varies as a function of ambient lighting conditions and cloud conditions, the elevation of the sun, and artificial light, among other things. It also may vary during the course of a long exposure. By mounting the incident light sensor so that it is always oriented to sample light corresponding to that on the side of the subject facing the camera, these and other problems are eliminated. Moreover, the diffusion dome 80, that takes in light from a broad angle, eliminates abrupt changes in speed (or other exposure control technique) that may be due to localized bright spots. Furthermore, in the case of backlighting of translucent objects where transmitted light becomes a factor, a correcting input as described below may be gained by mixing in the signal from the reflected light sensor. In general, in scenes involving physical blockages of light, such as a cave, a correcting input from the reflected light sensor serves to boost exposure for unusually dark areas of the scene.

Returning now to FIG. 5, the output signal(s) from the sensors 76,78 is (are) fed to a controller 132, and a motor or other controller 134 is connected to the output of the controller 132. The controller 132 provides a signal to the motor controller 134 in response to the output signal(s) of the sensors 76,78 to vary the angular velocity of the camera so that the exposure time is inversely proportional to light intensity and is adjusted continuously during rotation for the wide latitude of brightness encountered across a typical panoramic scene thereby always ensuring the correct exposure and therewith eliminating both under- and over-exposure. In alternate embodiments, the sensors 76,78 may be used singly or in combination, and any suitable weighting of the output signals thereof may be employed when used in combination, without departing from the inventive concepts. In alternative embodiments, the exposure may be continually adjusted other than by varying the angular velocity, such as by controllably changing the diaphragm of the lens, by controllably changing the width of the exposure slit, by controllably varying the line time, or by controllably varying the gain, without departing from the inventive concepts. In an alternative embodiment, the controller 132 reads a value of one or both of the incident or reflective light sensors 76,78 and stores it (them) in its memory device, not shown. Based on the stored value(s), the controller 132 then provides a signal to the motor controller 134 to fix the motor speed at a constant speed for the entire rotation yielding a constant exposure for the entire rotation of the camera. In alternative embodiments, the exposure may be determined other than by presetting the angular velocity, such as by controllably preselecting the diaphragm of the lens, by controllably preselecting the width of the exposure slit, by controllably preselecting the line time, or by controllably preselecting the gain without departing from the inventive concepts.

Figure 7:
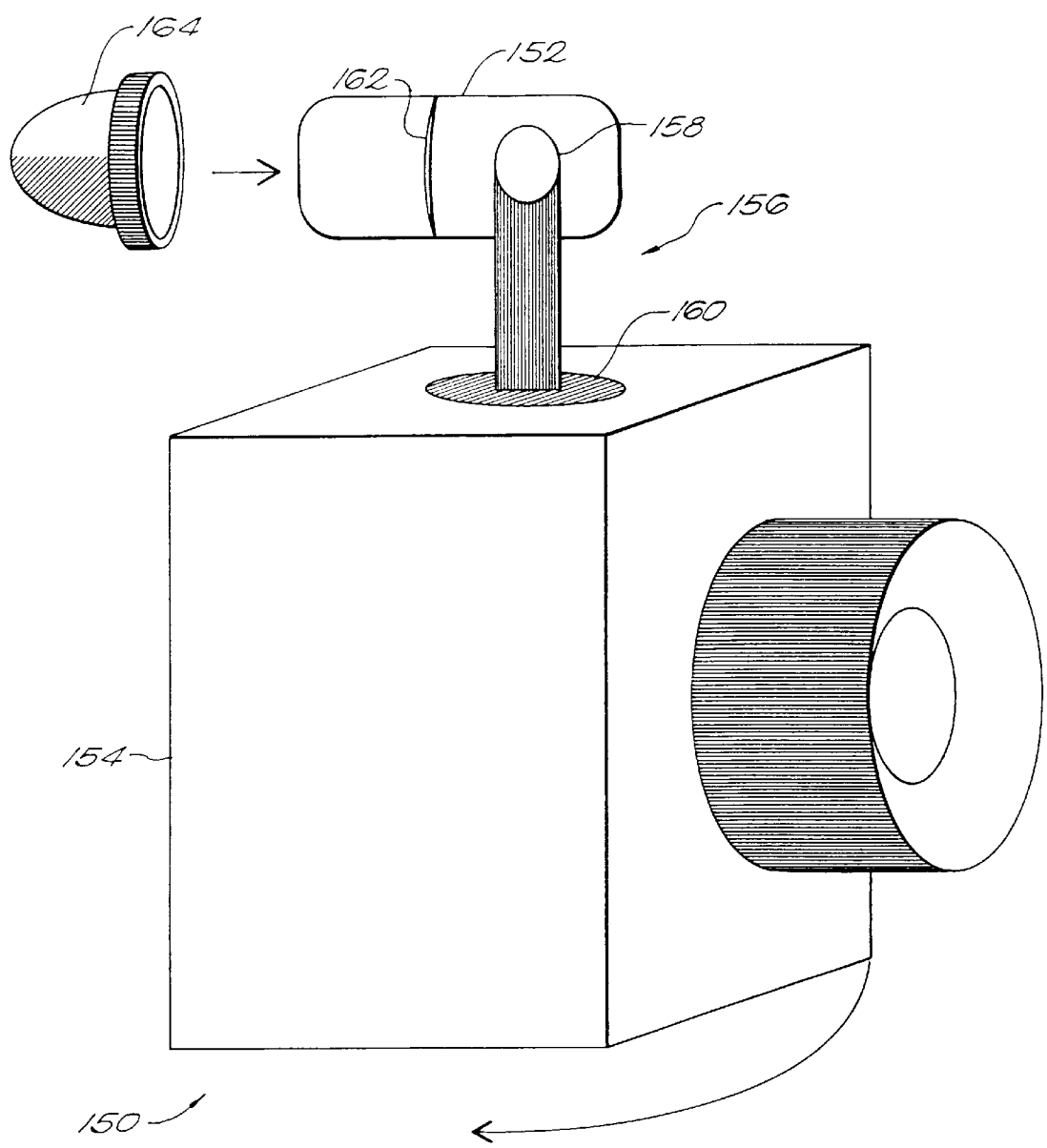
FIG. 7 is a perspective view of another light sensor system embodiment of a panoramic camera in accord with the present invention.

Referring now to FIG. 7, generally designated at 150 is a pictorial view illustrating another embodiment of an ambient light sensor system in accord with the panoramic camera or other panoramic camera in accord with the present invention. The ambient light sensor system 150 includes a barrel member 152 mounted to panoramic camera housing schematically illustrated at 154 via a two degree of freedom swivel mount generally designated 156. The two degree of freedom swivel mount 156 includes a first rotary joint 158 allowing the barrel member 152 to pivot in a vertical plane and a second rotary joint 160 allowing the barrel member 152 to pivot in a horizontal plane. Detents, not shown, may be provided to preselect certain positions of the two degree of freedom swivel mount. A light sensor 162 is mounted inside the barrel member 152. A diffuser dome 164 is removably attachable to the barrel member 162.

The ambient light sensor system 150 is operable in four (4) basic modes. In one mode, the diffuser dome 164 is mounted to the barrel 152, and the barrel 152 is pivoted about the rotary hinge 158 so as to point the light sensor 162 thereof generally upwardly. In this mode, the sensor 162 is sampling light from a generally upward direction so as to provide an incident light reading from which either a fixed exposure is preselected in a manner to be described over the panoramic scene or a variable exposure is adjusted in a manner to be described for changes in light which may occur over time, such as when a very long time exposure is made under varying cloud conditions. In another mode, the diffuser dome 164 is mounted to the barrel 152, and the barrel 152 is pivoted about the rotary hinges 158,160 so as to point the light sensor 162 thereof generally rearwardly (opposite to the direction that the lens faces). In this mode, the sensor provides an incident light reading from which exposure is continuously adjusted in a manner to be described over the panoramic scene. In its third mode, the diffusor dome 164 is removed and the barrel 152 is pivoted about the rotary hinges 158, 160 so as to point the light sensor 162 thereof generally forwardly (in the same direction that the lens faces). In this mode, the sensor provides a reflected light reading from which exposure is continuously adjusted in a manner to be described over the panoramic scene. The fourth mode is like the third, where the diffuser dome is removed from the barrel 152 housing the sensor 162, but differs therefrom in that the barrel is pivoted about the rotary hinges 158, 160 so as to point the light sensor 162 thereof at any selected angle about the hinge 158, and at any selected angle about the hinge 160, so as to sample light from any selected part of the panoramic scene. In this mode, the sensor provides a reflected light reading from which exposure is preselected in a manner to be described regardless of the starting point of the camera 154; otherwise, the starting point at the beginning and end of the image would fix the area sampled even though an area in the middle, for example, may be preferred.

Figure 8:
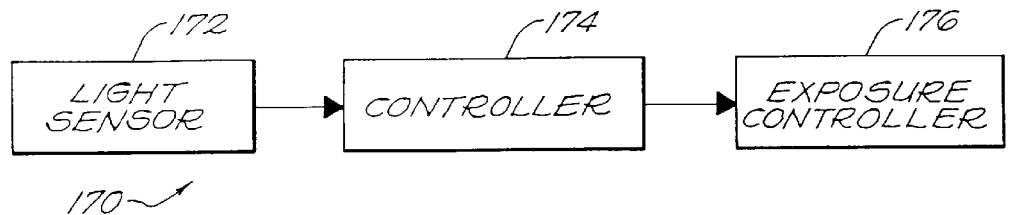
FIG. 8 is a functional block diagram of yet another embodiment of an ambient light responsive controller useful with the light sensor system of the FIG. 7 of a panoramic camera or other panoramic camera in accord with the present invention.

Referring now to FIG. 8, generally designated at 170 is a functional block diagram of an ambient light responsive controller for use with the ambient light sensor system 150 (FIG. 7) of a panoramic camera or other panoramic camera in accord with the present invention. The controller 170 includes a light sensor 172. The output signal of the sensor 172 is fed to a controller 174, and an exposure controller 176 is connected to the output of the controller 174. In one embodiment, the controller 174 provides a signal to the exposure controller 176 in response to the output signal of the sensor 172 to continuously vary the exposure during rotation to account for the wide latitude of brightness encountered across a typical panoramic scene thereby always ensuring the correct exposure and therewith eliminating both under- and over-exposure. In alternative embodiments, the exposure controller 176 may controllably vary rotation rate, CCD gain and/or line time (capture rate), or aperture (diaphragm), or slit width. To control the exposure of a digital capture device, such as a CCD, the controller 174 is responsive to the light sensor signal to controllably vary gain and/or line time about the panoramic scene in inverse proportion to light value as the camera rotates. Gain is increased as light value is decreased. In the case of line time, this may necessitate or allow a variation of rotation speed; that is, the rotation speed on the one hand must be reduced to allow for comparatively long line times and on the other hand it may be increased for comparatively short line times. By matching the motor speed to the line time, it is possible to minimize capture time for the entire sweep. Alternately, the camera may be rotated at a constant speed to accommodate the longest line time even though a shorter line time may be in use. That is, if the camera is rotated at a constant speed, the line time is varied in inverse dependence on the light sensor's signal as the camera is swept about the panoramic scene. Several constant speeds may be provided to accommodate various ranges of line times, such as indoor or outdoor, while generally limiting total capture time, the time it takes to capture the entire scene. In another embodiment, the controller 174 provides a signal to the exposure controller 176 in response to the output signal of the sensor 172 to preset the exposure during rotation so as to provide a constant exposure for the entire rotation of the camera. In alternative embodiments, the exposure controller 176 may preset rotation rate, CCD gain and/or line time (capture rate), or aperture (diaphragm) or slit width. To control the exposure of a digital capture device, such as a CCD, the controller 174 stores in memory a value of the light sensor and uses the stored value to set gain and/or line time. Gain is increased as light value is decreased. Or line time is increased as light value is decreased. Both gain and line time vary inversely with the sensor value.

Figure 9A:
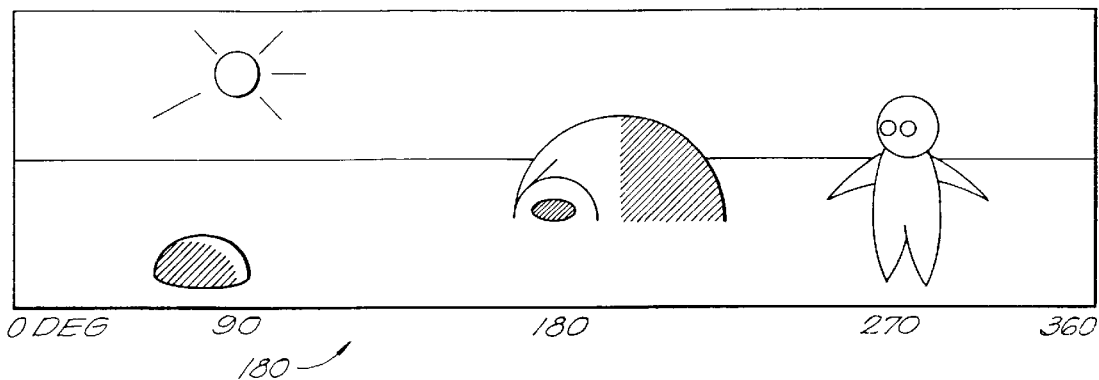
FIG. 9 illustrates in the FIG. 9A, FIGS. 9B, and 9C diagrams useful in explaining the principles of "sinewave" ambient light responsive exposure control of a panoramic camera in accord with the present invention.
Figure 9B:
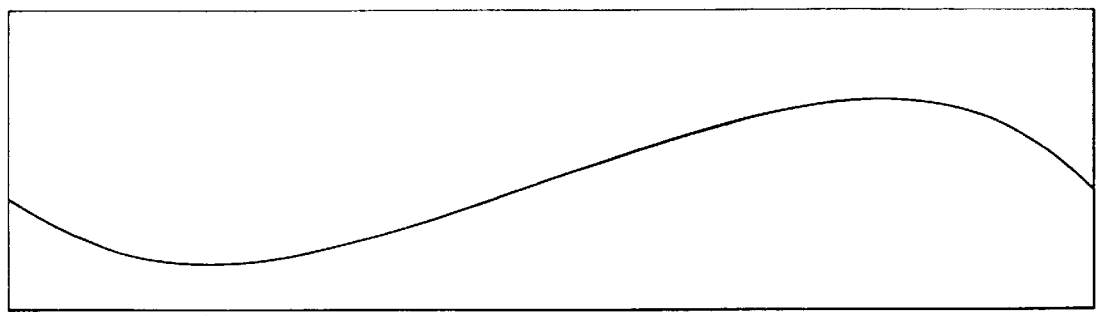
Figure 9C:
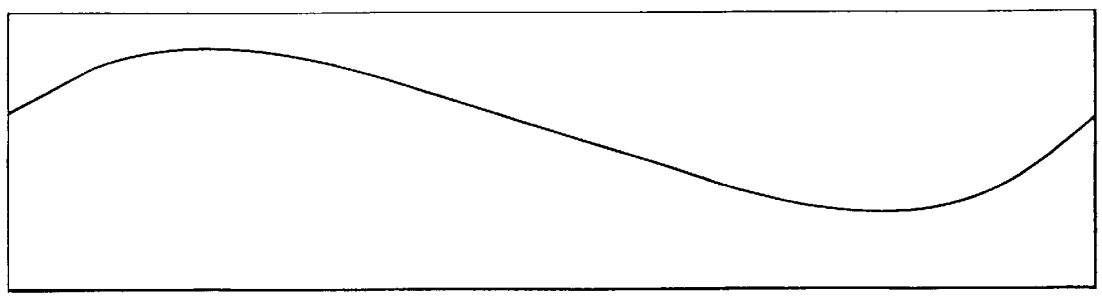

Referring now to FIG. 9, generally designated at 180, 190, and 200 in FIGS. 9A, 9B, and 9C are diagrams useful in explaining the principles of "sinewave" exposure control of a panoramic camera in accord with the present invention.

Any outdoor panoramic scene illuminated by the sun at an angle other than at the zenith will be backlit, sidelit and frontlit such that the backlit and frontlit scenes will lie one hundred eighty degrees (180) out of phase as illustrated by the exemplary rolled-out exposure diagram 180 of FIG. 9A having a backlit rock at about ninety (90) degrees, having a sidelit igloo at about one hundred eighty (180) degrees and a person frontlit at about two hundred seventy (270) degrees. For any such panoramic scene, the illumination of the side of the objects facing the camera in the lower portion of the scene excluding the sky will always be at minimum and maximum values respectively where the scene is backlit and frontlit, except in the case of generally horizontal reflecting objects, such as water. The sinewave diagram 190 of FIG. 9B shows the sinewave minimum and maximum respectively corresponding to the backlit rock at about ninety (90) degrees in FIG. 9A and to the frontlit person at about two hundred seventy (270) degrees in FIG. 9A. For any such panoramic scene, the overall brightness will vary with the declination of the sun, such that the higher the sun is in the sky the more bright the illumination on the scene, and the lower the sun the lesser the brightness, and with the prevailing weather conditions, such that the more cloudy the less bright and vice versa. As appears more fully below, "sinewave" ambient light responsive exposure control of a panoramic camera in accord with the present invention as shown by the control sinewave 200 of FIG. 9C is achieved by adjusting the sinewave's amplitude to both the sun's declination and to the prevailing ambient lighting conditions, and by adjusting the sinewave's phase to match the angular position of the starting point of the lens of the panoramic camera. In this manner, exposure is maximized in the most backlit portion of the scene and it is minimized in the most frontlit portion thereof.

Figure 10:
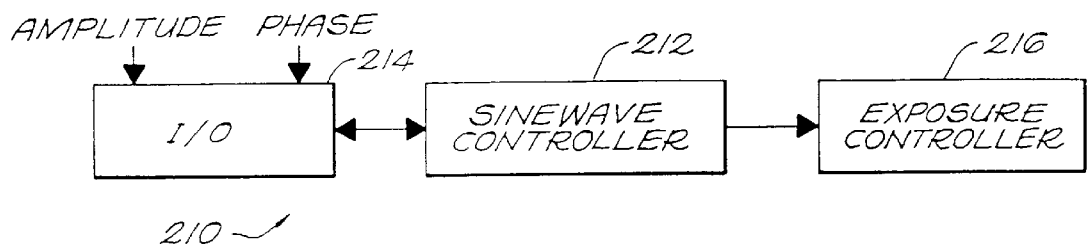
FIG. 10 is a functional block diagram of one embodiment of a "sinewave" ambient light responsive exposure controller of a panoramic camera in accord with the present invention.

Referring now to FIG. 10, generally designated at 210 is a functional block diagram of one embodiment of a "sinewave" ambient light responsive controller of a panoramic camera in accord with the present invention. A sinewave controller 212 having the usual ROM and RAM, not shown, is operatively connected to an I/O device 214, such as a keypad, and to an exposure controller 216. The exposure controller 216, like the exposure controller 176 (FIG. 8), may controllably vary rotation rate, CCD gain and/or line time (capture rate), or aperture (diaphragm) or slit width, among other things.

As appears more fully hereinbelow, in this embodiment, the amplitude of the sinewave is determined by the sinewave controller 212 in response to operator keypad entry of information representative of the declination of the sun and of information representative of the prevailing weather conditions. The phase of the sinewave is determined by the sinewave controller 212 in response to operator keypad entry of information representative of the position of the sun in the plane of rotation of the camera relative to the starting angular position of the lens of the panoramic camera. The exposure controller 216 is responsive to said sinewave of amplitude that corresponds to the sun's declination and prevailing weather conditions and of phase that corresponds to angular position of the sun in the plane of rotation of the camera relative to the len's starting position to control the exposure of the panoramic scene so as to compensate for the variation in lighting encountered about the panoramic scene.

Figure 11:
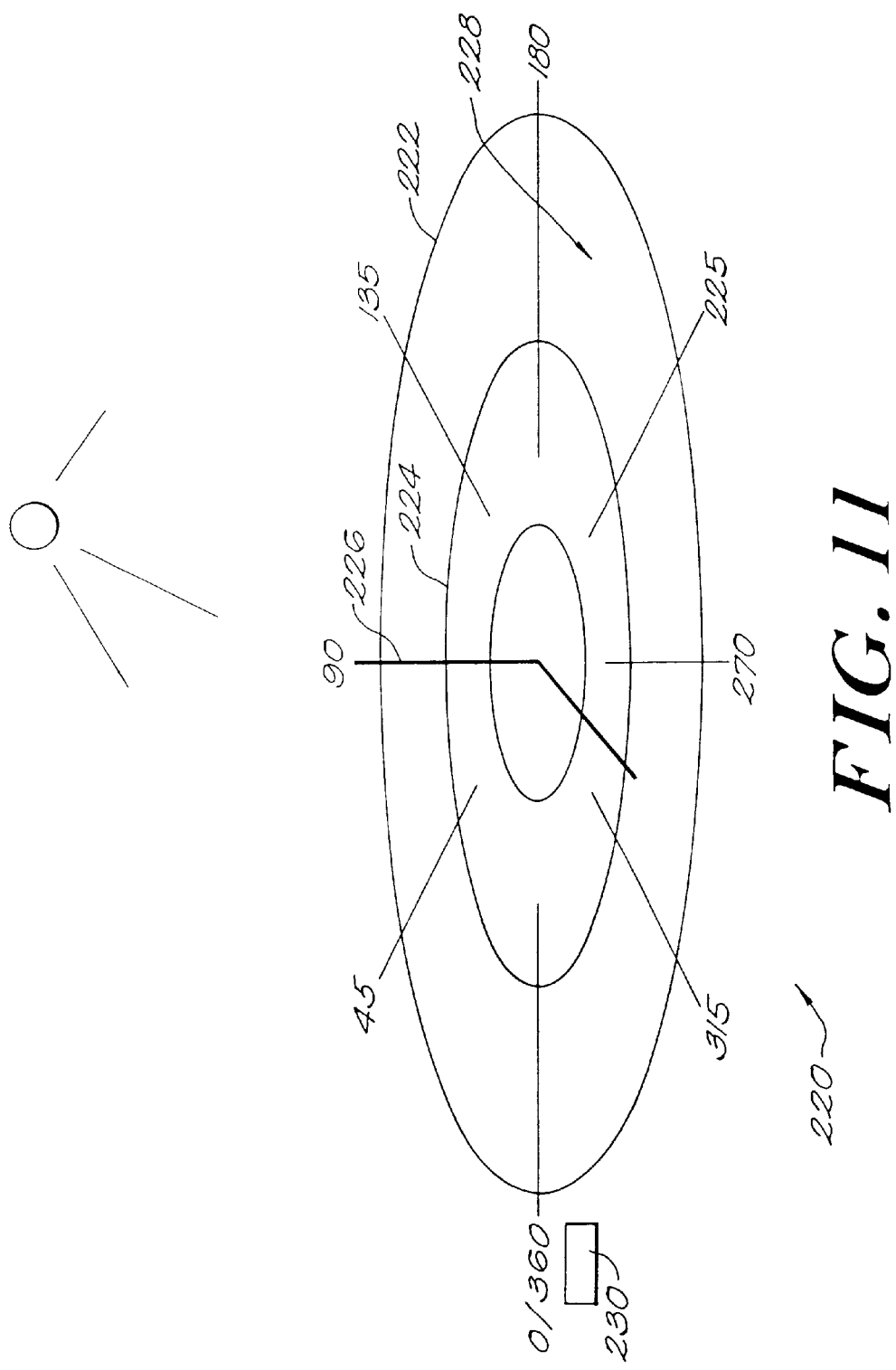
FIG. 11 is a pictorial view of a sun protractor having declination rings useful with the FIG. 10 embodiment of a "sinewave" ambient light responsive exposure controller of a panoramic camera in accord with the present invention.

Referring now to FIG. 11, generally designated at 220 is a pictorial view of a sun protractor having declination rings useful with the FIG. 10 embodiment of a "sinewave" ambient light responsive controller of a panoramic camera in accord with the present invention. The sun protractor 220 includes a graduated protractor ring 222, that also serves as a sun declination ring, one or more concentric sun declination rings 224, and a gnomon 226. The sun declination rings 222 each correspond to another "stop," where one stop equals a doubling or a halving of exposure. The rings are printed or otherwise provided preferably on a specular surface generally designated 228 mounted for rotation with the panoramic camera, not shown, although they may be provided separably of the camera so long as the relative orientations of camera lens and protractor are preserved. The lens of the panoramic camera is schematically illustrated by box 230 at the (0/360) degree mark.

To obtain the phase of the sinewave that matches the angular position of the sun in the plane of camera rotation relative to the starting point of the lens, the operator notes the angular position of the shadow the gnomon 226 casts on the projector ring 222 relative to the lens starting position, illustrated at about three hundred (300) degrees, and enters it to the keypad 214 (FIG. 10). To obtain the amplitude of the control sinewave that matches the sun's declination, the operator notes which declination ring the tip of the shadow cast by the gnomon 226 is at or near, and enters it to the keypad 214 (FIG. 10). To refine the amplitude of the control sinewave that matches the prevailing weather conditions, the operator may note which one of "clear," "partly cloudy," "overcast," or "deep shade" (or other preprogrammed) conditions most closely matches the prevailing conditions, and enters it to the keypad 214 (FIG. 10). The sinewave controller 212 (FIG. 10) responds to the manually entered information and produces a control sinewave corresponding thereto. The exposure controller 216 (FIG. 10) responds to the control sinewave provided by the sinewave controller to controllably vary exposure to accommodate the variations in lighting encountered about the panoramic scene.

On cloudy days when the shadow of the gnomon 226 is not cast or is barely cast, the operator looks into the specular surface 238 and moves around until a bright spot corresponding to the sun is collocated with the image of the tip of the gnomon, notes the angular position thereof on the protractor ring 222 and the declination ring which it is at or near, and sequentially enters the information on the keypad 214 (FIG. 10). The sinewave controller 212 (FIG. 10) responds to the manually entered information and produces a control sinewave corresponding thereto. The exposure controller 216 (FIG. 10) responds to the control sinewave provided by the sinewave controller to controllably vary exposure to accommodate the variations in lighting encountered about the panoramic scene.

Figure 12:
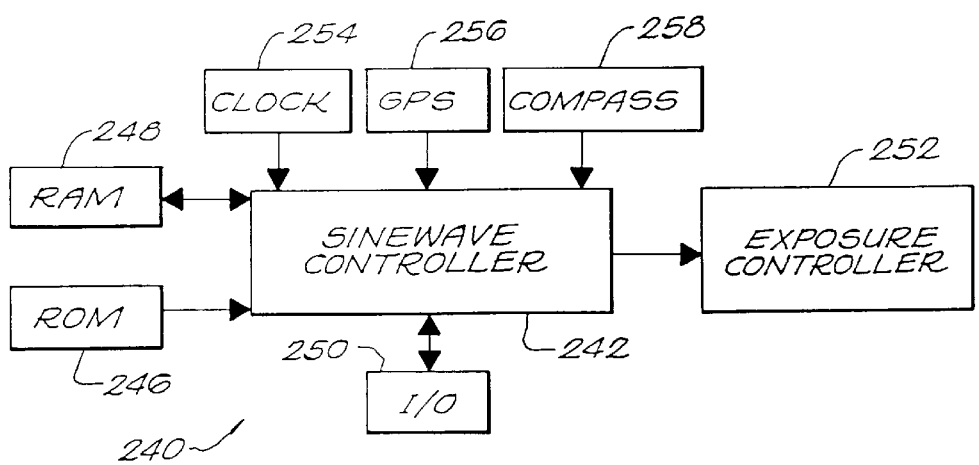
FIG. 12 is a functional block diagram of another embodiment of a "sinewave" ambient light responsive exposure controller of a panoramic camera in accord with the present invention.

Referring now to FIG. 12, generally designated at 240 is a functional block diagram of another embodiment of a "sinewave" ambient light responsive controller of a panoramic camera in accord with the present invention. A sinewave controller 242 having the usual ROM 246 and RAM 248 is operatively connected to an I/O device 250, such as a keypad, and to an exposure controller 252. The RAM 248 may be provided with table look up to enable the operator to retrieve the latitude and longitude of the panoramic site by keypad entry. The exposure controller 252, like the exposure controller 176 (FIG. 8) and the exposure controller 216 (FIG. 10), may controllably vary rotation rate, CCD gain and/or line time (capture rate), or aperture (diaphragm) or slit width, among other things.

The controller 242 is operatively connected to a time and date clock 254, a GPS system 256, and to an electronic compass 258.

In operation, the sinewave controller 242 is responsive to time and date information provided by the clock 254, to information representative of the latitude and longitude coordinates provided by the GPS 256, and to information representative of the bearing coordinates provided by the electronic compass 258 to determine the angular phase of the sinewave in the plane of rotation of the panoramic camera relative to the starting location of the lens. In an alternative embodiment, information representative of the latitude and longitude coordinates may be provided by table look up from the RAM 248 in response to operator entry of the city or other scene location on the keypad 250. The controller 242 is also responsive to the GPS (or table look up) information and to the clock information to determine solar declination, as well as to information manually entered on the keypad 250 representative of the prevailing weather conditions, such as "cloudy" or "bright," from which the amplitude of the control sinewave determined. The exposure controller 252 responds to the control sinewave provided by the sinewave controller 242 to controllably vary exposure to accommodate the variations in lighting encountered about the panoramic scene.

It is to be noted that the control sinewave provided by the embodiments of the FIGS. 10–12 may be used to approximate the overall exposure fairly accurately in addition to the corrections to it along the rotational path without reliance on a light metering system, said exposure being used independently or in combination with an overall exposure arrived at by a light metering element such as the incident light measuring dome on top of the camera measuring general incident light conditions. In addition, it is to be noted that the control sinewave provided by the embodiments of the FIGS. 10–12 may be used together with the signal (whether stored or in real time) of any of the light sensor embodiments described herein to control exposure. For example, gross over exposure of a sunset may be avoided by the included weighting of a frontally mounted reflective light sensor, such as by simple averaging of the two signals.

Many modifications of the instant invention may be made without departing from the scope of the appended claims. For example, the use of a cold mirror (one which reflects visible light and transmits infrared) as the specular member, or members of the virtual axis panoramic camera greatly reduces the infrared component of the incoming light obviating the use of special filters or light sources. This is particularly important in the case of CCD cameras where the imaging chip is more sensitive to infrared light than to the visible and the filters used to separate colors are not efficiently opaque to infrared light, thereby resulting in a contamination of visible light component images by an overlay of an infrared image causing a distortion of values and loss of color contrast and purity. In an alternative embodiment, in the case of a prism as a specular member displacing the image, the body of the prism could be of a material which absorbs infrared (such as the material known as 'heat absorbing glass') and the reflective surfaces of the prism or prisms could also be coated with a cold mirror coating further eliminating the infrared light component. It will be appreciated that the scan of the panoramic camera of the invention may be a full three hundred and sixty degree (360) scan or any angular part thereof. It will, of course, be appreciated by those of skill in the art that any of the controller devices described herein have the usual interfaces allowing the operator to input lens aperture, film speed and overall plus or minus exposure bracketing adjustment thereinto. It should also be noted that waveforms other than control sinewaves may be employed so long as there are no transitions steep enough so as to be conspicuous. It is also to be noted that a second point or node of the gnomon may be indexed by placing a bead or other shadow casting means to expand the range of readable stops. It is also to be noted that GPS, table look up, the sun protractor and declination rings are exemplary only, and that other methods and means may be employed to obtain the amplitude and phase of the control sinewave or other control waveform in accord with the present invention.

What is claimed is:

1. A panoramic camera providing automatic exposure control, comprising:

a camera housing;

an optical assembly including a lens mounted to said camera housing and having an optical axis that points along a linear direction;

means for sweeping said linear direction that said optical axis points about a panoramic field of view;

means coupled to said exposing means for providing a control waveform having an amplitude and a phase, whose amplitude is matched to existing lighting conditions and whose phase is matched to the position of the sun in the plane of camera rotation relative to the starting phase of the lens; and an exposure controller means, responsive to said control waveform, for controllably compensating exposure for the variations found in lighting about a typical outdoor panoramic scene in accord with said control waveform.

2. The panoramic camera providing automatic exposure control of claim 1, further including a keypad and a sun protractor having plural concentric sun declination rings indexed to the number of stops mounted for rotation with the camera housing, where said phase of said control waveform is read off the protractor and manually entered on said keypad, and where said amplitude of said control waveform is read off the appropriate one of the concentric sun declination rings, and it is entered on the keypad.

3. The panoramic camera providing automatic exposure control of claim 1, further including a clock providing information representative of time and date, an electronic compass providing information indexed to the starting phase of the lens and a device providing information representative of latitude and longitude coordinates of the panoramic scene, where said phase and amplitude of said control waveform are automatically determined from the information provided by said time and date clock, by said electronic compass, and by said latitude and longitude device.

4. The panoramic camera providing automatic exposure control of claim 3, wherein said information representative of latitude and longitude is provided by a GPS (global positioning satellite system).

5. The panoramic camera providing automatic exposure control of claim 3, wherein said information representative of latitude and longitude is provided by RAM table look-up.

6. The panoramic camera providing automatic exposure control of claim 1, further including a keypad, and where said amplitude of said control waveform is determined in response to operator input of information representative of existing lighting conditions on said keypad.

7. The panoramic camera providing automatic exposure control of claim 1, wherein said control waveform is a control sinewave.

* * * * *